July 29, 1952  F. G. CLARK  2,604,741
SHARPENING MECHANISM FOR CUTTING MACHINES
Filed Nov. 18, 1948  6 Sheets-Sheet 1

INVENTOR.
Frederick G. Clark
BY Parker, Birchmore Farmer,
Attorneys.

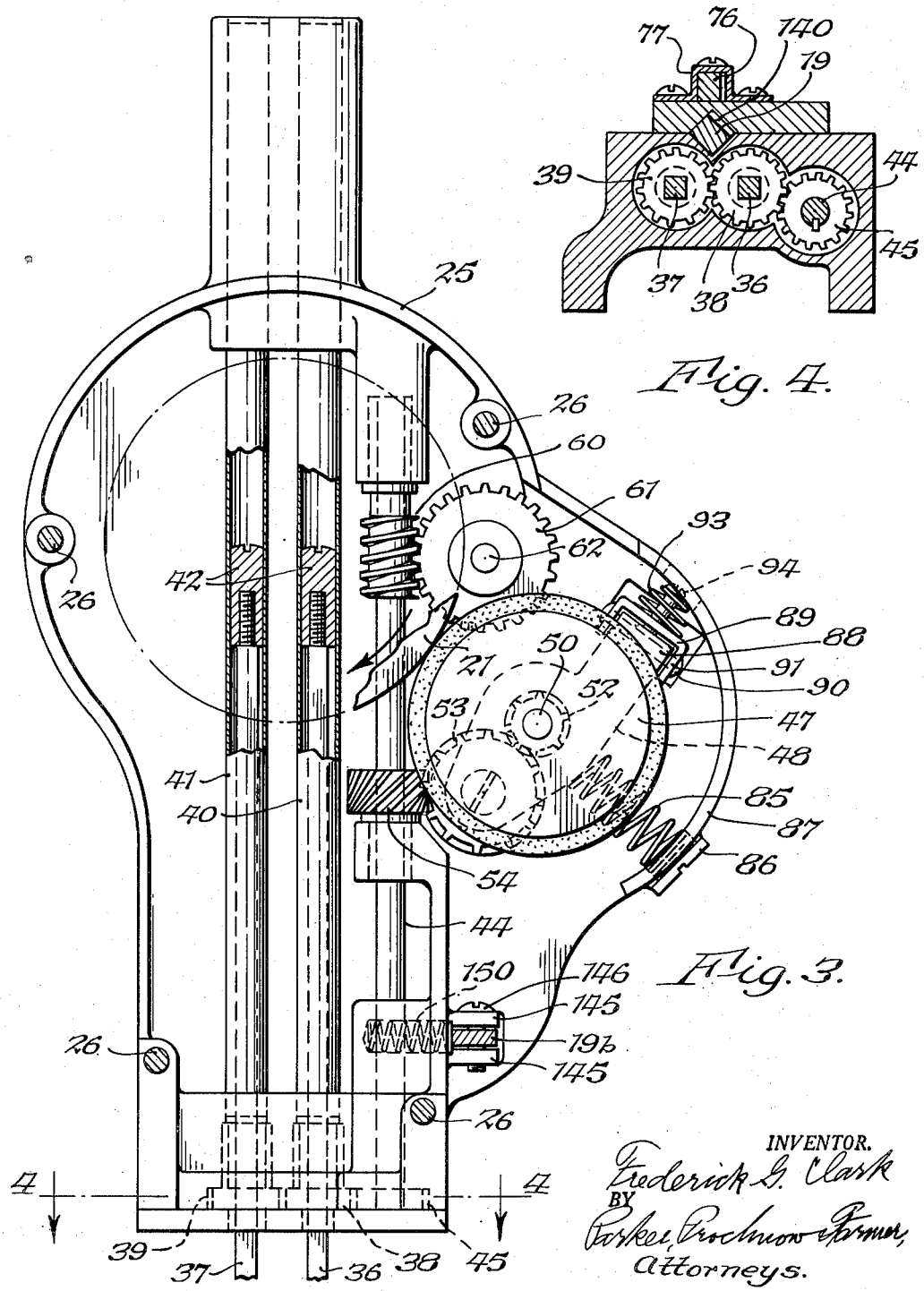

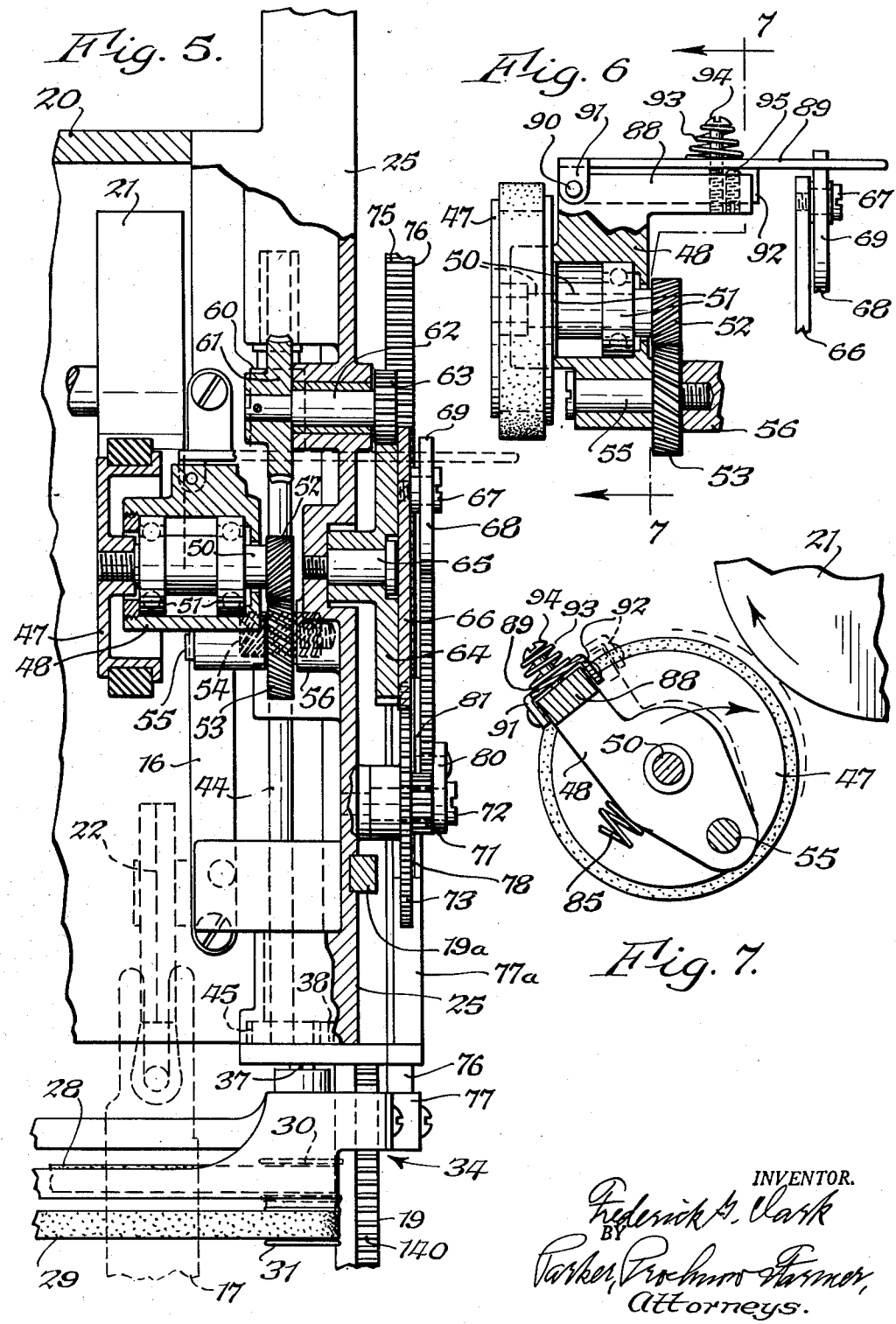

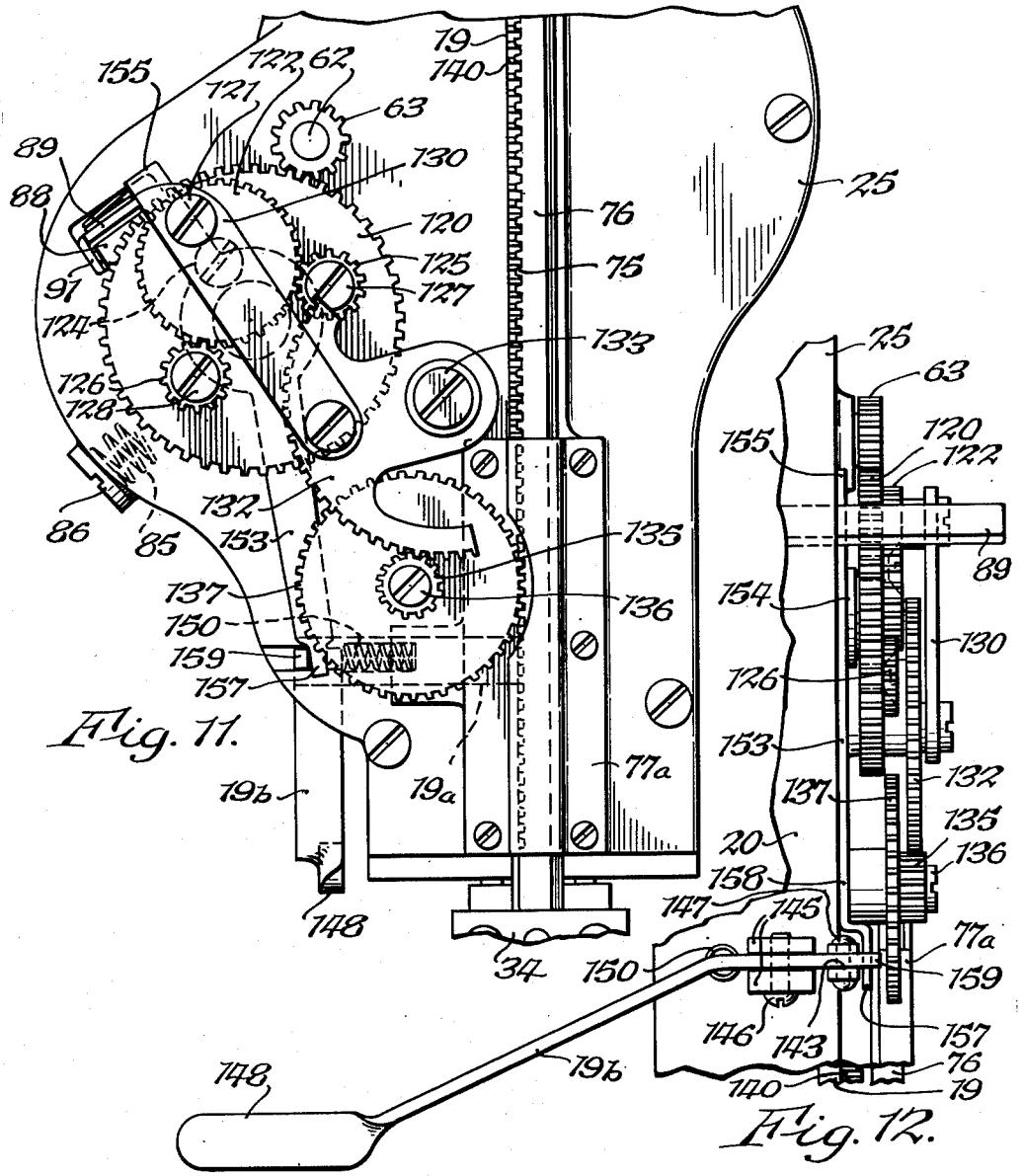

July 29, 1952 F. G. CLARK 2,604,741
SHARPENING MECHANISM FOR CUTTING MACHINES
Filed Nov. 18, 1948 6 Sheets-Sheet 6
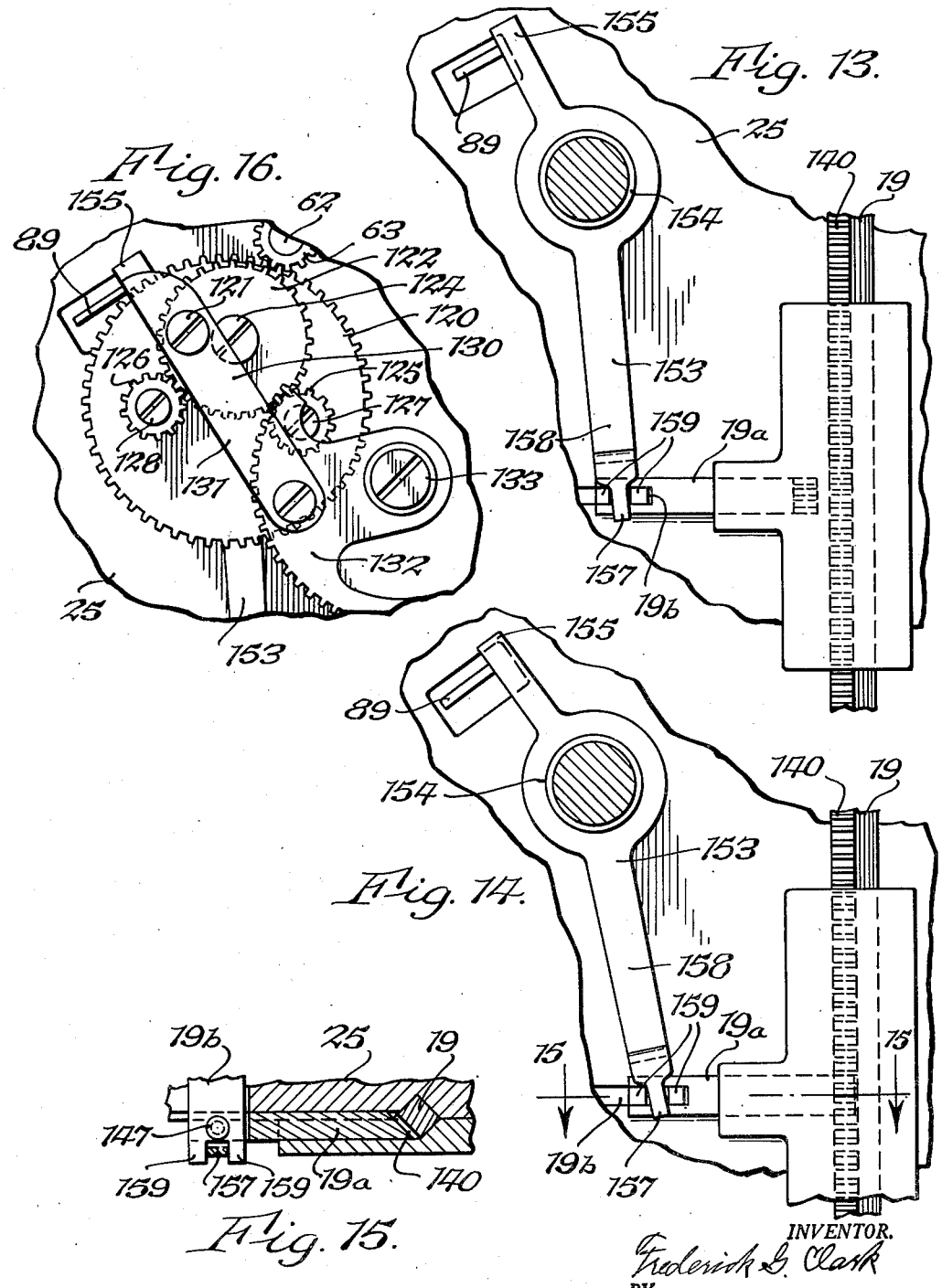

Patented July 29, 1952

2,604,741

UNITED STATES PATENT OFFICE 2,604,741

SHARPENING MECHANISM FOR CUTTING MACHINES

Frederick G. Clark, Buffalo, N. Y., assignor to Eastman Machine Company, Buffalo, N. Y.

Application November 18, 1948, Serial No. 60,796

18 Claims. (Cl. 51—246)

This invention relates to knife sharpening mechanisms for cutting machines, and more particularly to mechanisms of this kind for use with portable cutting machines of the type commonly employed for cutting cloth and other sheet materials, and which includes a reciprocating knife having a substantially vertical cutting edge.

One of the objects of this invention is to provide a sharpening mechanism with means of improved construction for reciprocating the sharpening devices along the edge of the knife. Another object is to provide a mechanism of this type in which the travel of the sharpening implements lengthwise of the knife can be varied without the use of clutches. It is also an object to provide a mechanism of this kind with drive means of improved construction. A further object is to provide a mechanism of this type with means of improved construction for stopping the operation of the knife sharpening mechanism when its cycle of operation has been completed. Another object of this invention is to provide a sharpening mechanism of this type with means of improved construction for actuating a vertically movable bar by means of which the knife sharpening mechanism is moved vertically from power derived from the flywheel or crank wheel of the machine. Another object is to provide mechanism of improved construction for releasing the presser foot when the sharpening mechanism is used.

Other objects and advantages of this invention will appear from the following description and claims.

In the accompanying drawings:

Fig. 3 is a rear elevation, partly in section, of the mechanism shown in Fig. 1.

Fig. 4 is a transverse, sectional plan view thereof, on line 4—4, Fig. 3.

Fig. 5 is a side elevation thereof, partly in section, approximately on the line 5—5, Fig. 1.

Fig. 6 is a fragmentary side elevation thereof, partly in section, showing the oscillatory bracket on which part of the drive for the sharpening mechanism is supported.

Fig. 7 is a fragmentary, sectional elevation thereof, on line 7—7, Fig. 6.

Fig. 11 is a fragmentary, front elevation of a knife sharpening mechanism of modified construction.

Fig. 12 is a fragmentary side elevation thereof.

Fig. 13 is a fragmentary, sectional front elevation thereof showing a mechanism for releasing the presser foot when the cutting mechanism is to be used.

Fig. 14 is a view similar to Fig. 13 showing the parts in position for holding the presser foot in operative relation to the work.

Fig. 15 is a sectional view thereof, on line 15—15, Fig. 14.

Fig. 16 is a fragmentary front elevation of part of the mechanism for moving the knife sharpening carriage.

Figure 1:
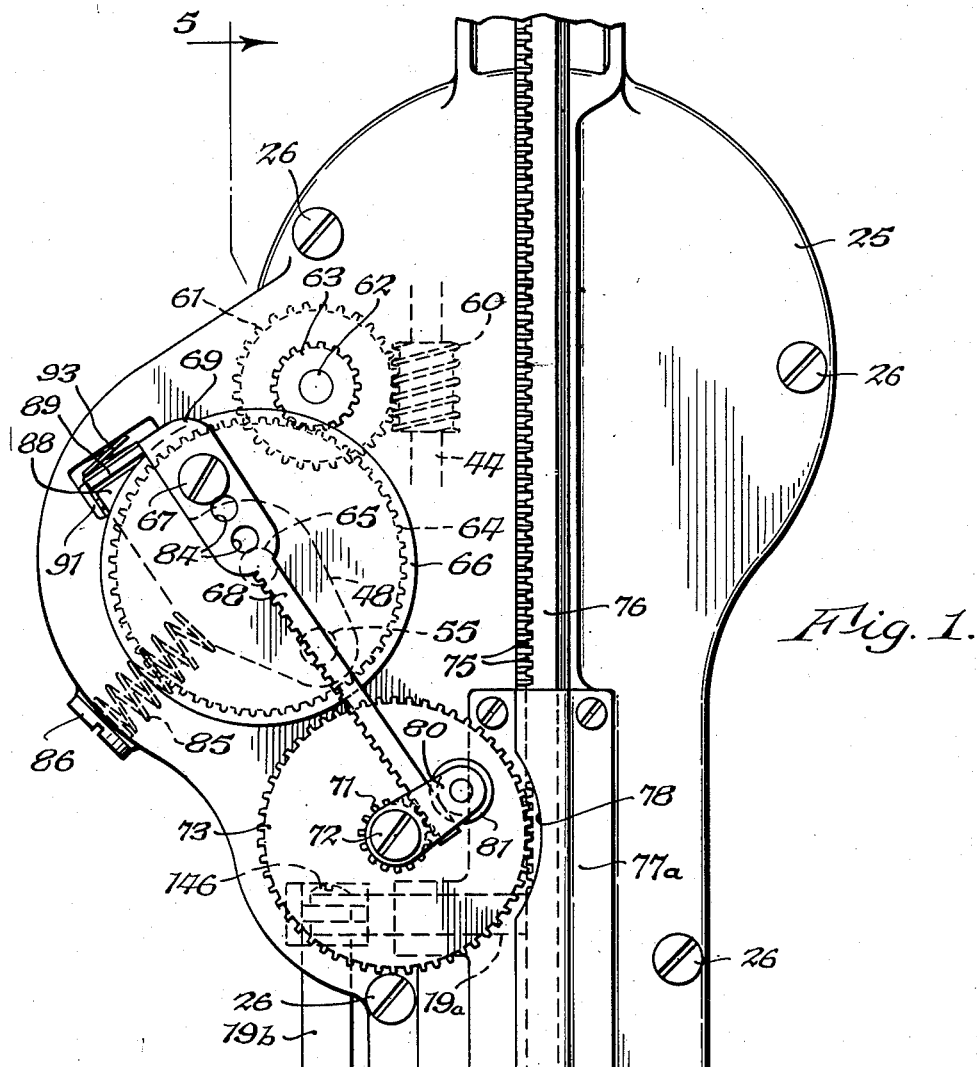
Fig. 1 is a front elevation of a knife sharpening mechanism embodying this invention and detached from the cutting machine.

The cutting machine in connection with which my improvements are used may be of any suitable, well known type, and consequently, only parts of the cutting machine are shown in the drawings.

Figure 8:
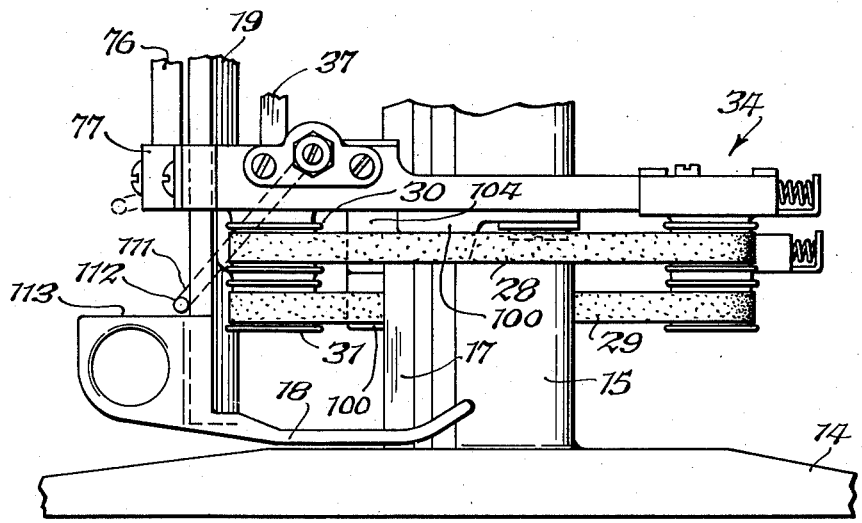
Fig. 8 is a fragmentary side elevation of the lower portion of a cutting machine showing a sharpening belt carriage in a lowered position.

The cutting machine includes a base 14, shown in Fig. 8, which is movable on the surface on which the cloth or other material to be cut is supported, and a slender standard 15 extends upwardly from the base and is secured at its lower end to the base and supports the motor (not shown) and other mechanism of the cutting machine, including a connecting rod or pitman 16, Fig. 5, which reciprocates a knife 17. The front of the standard is provided with the usual guide means for the knife 17. 18 represents a presser foot which bears on the top surface of the material to be cut and which has a slot or recess therein within which the knife reciprocates. The presser foot is attached to an upright rod 19 by means of which it may be adjusted to the desired elevation. This rod in the construction shown is square in cross section and is provided with teeth or projections with which a toothed end of a presser foot locking bolt 19a may engage to hold the presser foot at the desired elevation above the base 14, as is customary in cloth cutting machines, the bolt 19a being slidably mounted on the frame 20 of the cutting machine to guide it into and out of locking position, and being actuated by the operator through the medium of a hand lever 19b. A part only of the frame 20 is shown in Fig. 5, within which a motor is mounted for reciprocating the knife 17, this motor including a crank wheel or flywheel 21 to which the connecting rod or pitman 16 is connected. This pitman cooperates with a crosshead 22 for transmitting reciprocatory motion to the knife 17.

The knife sharpening mechanism embodying this invention is enclosed in and mounted on a suitable housing 25 which may be secured to the cutting machine housing 20 in any desired manner, for example, by means of bolts or screws 26 shown in Figs. 1 and 3.

Figure 9:
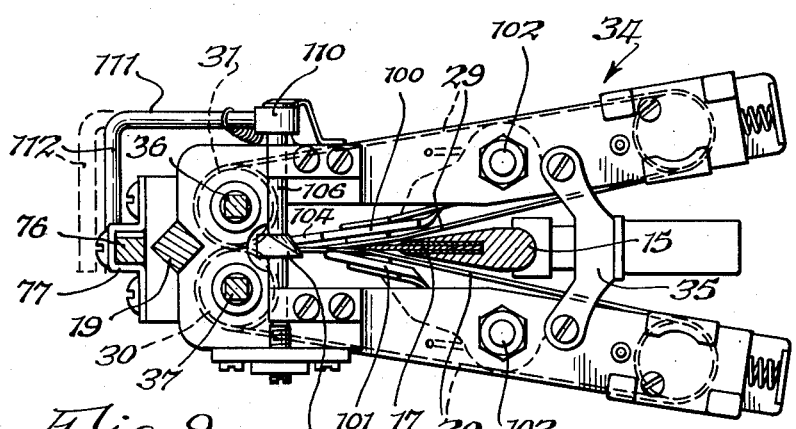
Fig. 9 is a top plan view of the belt carriage shown in Fig. 8, with some of the parts shown in section.

The sharpening of the knife, which may be accomplished by any desired type of grinding devices, is preferably effected by means of belts 28 and 29, each having one face thereof coated with suitable abrasive material. As usual, these belts operate over driven pulleys 30 and 31, Figs. 1, 8 and 9. The belts also pass around idler pulleys mounted to rotate on a suitable belt carriage 34 which is arranged to move up and down lengthwise of the knife so as to enable the knife edge to be sharpened throughout its entire length by contact with the abrasive surfaces of the belts 28 and 29. 35 represents a guide member mounted on the belt carriage and cooperating with the rear edge of the standard 15 for guiding the belt carriage in its vertical movement. Since belt carriages of this type are well known, a more detailed description of the same is not deemed necessary.

The driven pulleys 30 and 31 are suitably secured to the lower ends of vertical shafts 36 and 37. These shafts are preferably square or rectangular in cross section, or may be splined, and are mounted to slide vertically through gears 38 and 39 respectively and to rotate with these gears. The upper ends of these shafts are suitably guided on the frame 25 for axial movement. These shafts may, for example, be guided as shown in my Patent No. 2,537,208 of January 9, 1951. According to this application, these shafts extend into guide tubes 40 and 41 suitably secured on the housing 25, and each shaft is provided with a follower 42 on the upper end thereof. These followers are preferably rigidly secured to the upper ends of the shaft, for example, by means of threaded ends on the shafts extending into threaded holes in the followers, and the followers have a sliding and rotatable fit within the guide tubes 41 and 42, so as to hold the shafts in correct relation to each other and to the gears 38 and 39 which mesh with each other.

The shafts 36 and 37 receive rotary motion from a drive shaft 44 suitably journalled on the housing 25, and having a gear 45 secured to the lower end thereof which meshes with the gear 38, and thus supplies power and rotary motion to both of the drive shafts for driving the knife sharpening belts 28 and 29. The drive shaft 44 is driven from the flywheel 21 by means of a driven wheel 47 which is suitably journalled on a bracket 48 pivotally mounted on the frame 25, in such a manner that the wheel 47 can be moved into and out of engagement with the flywheel 21. The wheel 47 may be provided with the usual rubber tire or band for providing the desired friction for driving the wheel 47 from the flywheel.

The wheel 47 is mounted on a shaft 50 which is journalled in suitable bearings 51 on the bracket 48 and the shaft 50 has a gear 52 mounted thereon which drives a gear 53, both of these gears preferably being spiral gears. The spiral gear 53 drives a spiral pinion 54 secured to the drive shaft 44. The spiral gear 53 is journalled to rotate about a pin 55 secured to a lug or projection 56 of the frame 25, and this pin also serves as a pivot on which the bracket 48 is mounted to swing to a limited extent to move the wheel 47 into and out of engagement with the flywheel 21. Consequently, when the wheel 47 is in frictional engagement with the flywheel 21, the drive shaft 44 will be rotated to supply power to the shafts 36 and 36 on which the abrasive belt pulleys are secured.

Means of improved construction are provided for producing reciprocatory motion of the carriage 34 on which the knife sharpening belts or other implements are mounted, and in the particular embodiments the invention illustrated in the drawings, the power for reciprocating the carriage is also derived from the drive shaft 44 which is provided near the upper portion thereof with a worm 60, see particularly Figs. 1, 3 and 5, which engages a worm wheel 61 secured to a shaft 62 journalled on the frame 25. The shaft 62 has a gear wheel 63 secured on the other end thereof which drives a gear 64 journalled on a bearing pin 65 secured to the frame member 25. This gear 64 has secured thereto a crank disk 66 which has a crank pin 67 secured thereto on which one end of a pitman or walking beam 68 is pivotally mounted. The pitman or walking beam preferably has an enlarged upper end portion 69 which is apertured to receive the crank pin 67. Consequently, it will be obvious that when the crank disk 66 is revolved by means of the gear 64, a motion of translation in a circle will be imparted to the end 69 of the pitman.

The motion imparted to the pitman 68 may be transmitted in any suitable manner to the belt carriage 34. In the construction illustrated for this purpose, the pitman 68 is in the form of a rack having teeth formed on one edge thereof.

The teeth of the rack of the pitman 68 engage a pinion 71 rotatably mounted on a stud 72, the inner end of which is secured to the frame member 25, and another gear 73 is rigidly secured to the pinion 71 to rotate therewith, and this larger gear 73 meshes with rack teeth 75 formed on a vertically movable bar 76, the lower end of which is rigidly secured to the belt carriage 34, for example, by means of a clamp 77. It will thus be noted that as the crank disk 66 moves from the position shown in Fig. 1, in a counterclockwise direction, the rack bar 68 will be moved into various angular relations, but in a generally downward direction, and this results in the rotation of the gears 71 and 73 connected thereto in such a manner that the vertically movable rack bar 76 will move downwardly, and when the crank disk 66 continues its rotation and returns to the position shown in Fig. 1, the gears 71 and 73 will be rotated in the opposite direction, thus raising the rack bar 76. 77a represents a slide bearing secured to the housing 25 and having a U-shaped part in which the rack portion of the pitman 68 is guided for vertical movement, a portion of the U-shaped part being cut out as shown at 78 to enable the gear 73 to engage the teeth of the rack bar.

The pitman or rack 68 may be held in operative relation to the pinion 71 in any suitable or desired manner, and in the construction shown for this purpose in Fig. 1, a link 80 is pivotally mounted at one end thereof on the bearing pin 72 and has a grooved pulley or wheel 81 pivotally mounted on the other end thereof. This wheel is formed to engage the back of the rack 68 and thus holds it in engagement with the gear 71. As the pitman or rack 68, because of its direct driving connection with the crank disk 66, assumes various angular positions, the link 80 will swing about the bearing pin 72, so that the grooved wheel 81 will at all times remain in engagement with the back of the rack 68, and consequently, always hold this rack bar in operative relation to the pinion 71.

Figure 2:
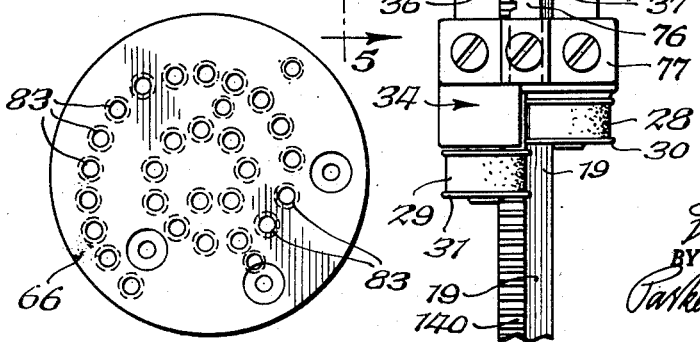
Fig. 2 is a face view of a crank disk employed in connection with this mechanism.

Since cutting machines of the type described may be provided with knives of many different lengths, it is desirable to provide suitable means for adjusting the travel of the belt carriage 34 in accordance with the length of the knife which is being used. This can readily be accomplished, for example, by varying the length of the stroke of the pitman 68. For example, the crank disk 66 may be provided, as shown in Fig. 2, with a plurality of threaded apertures 83, any one of which may receive the threaded end of the crank pin 67, so that the length of the stroke of the pitman or rack 68 may be varied as desired. When any of the holes 83 is selected for obtaining the desired movement of the belt carriage, the gear 64 may be rotated while the rack or pitman 68 is disconnected therefrom to occupy a position at one end of the stroke of rack bar 76, and the link 80 may be released by removing the bearing pin 72, so that the pitman 68 may be moved into proper engagement with the teeth of the pinion 71, so that the proper gear relationship is established to provide the correct movement of the rack bar 76. When it is necessary to connect the pitman 68 through the crank pin 67 with apertures nearer to the center of the crank disk 66, this crank pin may be passed through additional holes 84 in the enlarged part 69 of the pitman, so that the outer end of the enlarged part may extend somewhat beyond the periphery of the crank disk when the same is in the position shown in Fig. 1, for reasons hereinafter explained. Any other suitable means for varying the length of the stroke of the pitman or rack 68 could be provided if desired.

The swinging of the bracket 48 to move the wheel 47 into and out of engagement with the flywheel may be effected in any suitable or desired manner and preferably the mechanism for accomplishing this result is so constructed that the bracket 48 will be returned to an inoperative position in which the wheel 47 is out of engagement with the flywheel by means of the pitman 68 when the same has completed one cycle of movement and the carriage 34 has been returned to its upper position. In order to accomplish this result, the pivoted bracket 48 is normally urged, for example, by means of a spring 85 into a position in which the wheel 47 is in engagement with the flywheel 21. One end of this spring shown engages the bracket 48 and the other end thereof bears against a screw 86 engaging the threaded hole in the rim or flange 87 of the frame member or housing 25.

The bracket 48 is provided with a rigid or integral extension 88 projecting toward the front of the machine and an arm 89 is pivoted on a pivot pin 90 on the bracket 48. For this purpose, the arm 89 preferably has a downwardly extending ear or lug 91 on one side thereof and a flange 92 on the other side, the pivot pin extending through the lug and flange. The flange 92 may engage a side of the extension 88 and a portion of the arm extends forwardly beyond the extension 88, as clearly shown in Fig. 6, into position to be engaged by the head or enlarged end 69 of the pitman or rack 68. The arm 89 is normally held in its lower position in the path of movement of the part 69 of the pitman by means of a spring 93, one end of which engages a screw 94. This screw engages a threaded hole in the extension 88 of the bracket 48, and another screw 95 in this extension may be provided to limit the extent to which the arm 89 is urged downwardly by the spring 93. The upper part 69 of the pitman or rack, consequently, normally holds the bracket 48 against the action of its spring 85 in a position in which the wheel 47 is out of engagement with the flywheel 21. When it is desired to start the cycle of movement of the sharpening mechanism, the arm 89 is moved upwardly by hand against the action of the coil spring 93 to permit the pitman or rack to disengage the arm 89, whereupon the spring 85 will immediately swing the bracket 48 into a position in which the wheel 47 engages the flywheel 21, whereupon the mechanism will begin to operate, rotating the drive shaft 44, the shafts 36 and 37, and the gearing which turns the crank disk 66. The arm 89 may then be released, whereupon it will be moved by the spring into the path of movement of the part 69 of the pitman 68. Upon completion of the cycle of movement of the carriage 34 of the blade sharpening mechanism, the upper end of the pitman or rack 68 will engage the arm 89 and move the bracket 48 about its pivot 55 against the action of the spring 85 into a position in which the wheel 47 is out of engagement with the flywheel 21. The mechanism is thus brought to a stop and the bracket will be held in its inoperative position until the arm 89 is again raised.

Figure 10:
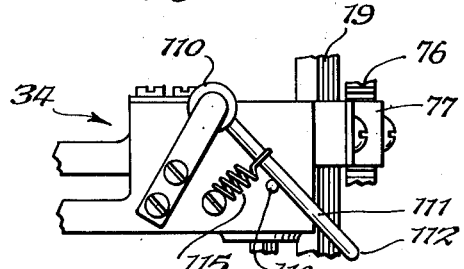
Fig. 10 is a fragmentary side elevation thereof.

Since the knife 17 reciprocates during the sharpening of the same, the lower edge of the knife will pass upwardly above the lower belt 28, when the belt carriage is near the lower end of its stroke. I have, consequently, provided means for moving the portion of this belt which engages the knife laterally to clear the knife when the belt carriage is in the lower portion of its movement. In this connection, attention is called to the fact that the inner faces of the belts 28 and 29 pass into engagement with shoes 100 and 101 which are yieldingly mounted to urge the belts 28 and 29 into engagement with the edge of the knife, these shoes being pivotally mounted on pins or bolts 102 and 103 on the belt carriage 34. In accordance with my invention, the lower shoe is provided with a forwardly and upwardly extending part 104 which is arranged in position to be engaged by a cam 105 for moving the lower shoe against the action of its spring out of engagement with the knife blade. This cam is mounted on a shaft 106, the ends of which are suitably journalled on the belt carriage. One end of this shaft has a hub 110 secured thereto and an arm 111 projects outwardly from this hub and has a part 112 bent at a right angle thereto into position to engage an upper flat surface 113 of the presser foot. It will, consequently, be noted that as the belt carriage approaches its lower position as shown in Fig. 8, the arm 111 will be swung upwardly by engagement with the upper face of the presser foot into the position shown in broken lines in Fig. 8. This movement of the arm causes rotation of the cam 105, so that the cam engages the extension 104 of the shoe 100 and moves the same in the direction away from the knife edge. Consequently, during the lower portion of the movement of the belt carriage only the upper belt 29 will engage the lower portion of the edge of the knife and when the knife moves downwardly, it will clear the lower belt 28 and thus eliminate the possibility of damaging this belt as the belt carriage rises, the arm 111 will again be urged to swing downwardly by means of a spring 115, Figs. 9 and 10, thus returning the shoe 100 into position to press the belt 28 against the edge of the knife blade. A pin 116 on the belt carriage 34 limits the extent to which the arm 111 may be swung by the spring 115, so that it will be in correct position to again engage the upper face of the presser foot upon the next downward movement of the belt carriage 34. The parts of the mechanism are preferably so adjusted that shoe 100 will again move the belt 28 into engagement with the knife when the belt carriage has moved into a position sufficiently high so that when the knife is in its upper position, the lower end thereof will not be above the lower belt 28.

The sharpening mechanism described has the advantage that all of the gears and racks are in mesh at all times and no clutches are necessary to reverse the motion of the belt carriage, thus eliminating difficulties heretofore encountered with the failure of clutches to operate. The sharpening mechanism has the further advantage that the wheel 47 is positively moved out of frictional engagement with the flywheel by means of the engagement of the rack 68 with the arm 89, thus providing a very effective and relatively inexpensive construction which is very positive in its operation.

The mounting of the wheel 47 on a pivoted bracket in such a manner that the wheel 47 can swing into engagement with the flywheel as shown also has the advantage that the wheel 47 engages the flywheel with a certain amount of wedging or toggle action, due to the rotation of the flywheel in the direction indicated by the arrow in Fig. 3, so that comparatively little pressure is required for the spring 85 to hold the bracket 48 in position in which to drive the wheel 47. Since very little pressure is required on the part of the spring 85, it also follows that comparatively little force is required to hold the bracket in its inoperative position.

In Figs. 11, 12 and 16 is shown a mechanism of modified construction for moving the rack bar 76 on which the belt carriage 34 is mounted up and down to effect sharpening of the knife, the mechanism for driving the belts and for swinging the bracket 48 to move the wheel 47 into and out of engagement with the flywheel being the same as illustrated in connection with Figs. 1 to 10. In this construction, a crank wheel 120 of modified construction is employed, which has gear teeth on its periphery meshing with the pinion 63 on the shaft 62 which is driven from the drive shaft 44. This crank wheel has a crank pin 121 adjustably mounted thereon at different distances from the axis of rotation of crank wheel, so that the throw of the crank may be varied as desired. In the construction shown by way of example for this purpose, the crank pin 121 is secured on a disk 122 eccentrically pivoted on the crank wheel by means of a screw 124, which may be tightened to clamp the disk to the crank wheel. The disk 122 may be readily adjusted about the screw 124 when the same is loosened, to move the crank pin 121 thereon into different relations with reference to the axis of the crank wheel 120 and additional means are preferably provided for securing this disk 122 in any position in which it may be set. In the construction shown for this purpose, the disk is provided with gear teeth on its periphery and a pair of pinions 125 and 126 are mounted on the crank wheel by means of screws 127 and 128 engaging in threaded holes in the crank wheel 120. These pinions are so mounted that by tightening the screws 127 and 128, the pinions may be locked against rotation. Consequently, if it is desired to adjust the throw of the crank 121, the screws 124, 127 and 128 are loosened to permit the gear wheel 122 carrying the crank 121 to be turned about its axis and when the desired adjustment has been made, the screws 124, 127 and 128 are again tightened to prevent turning of the pinions 125 and 126, and of the crank disk 122. The crank 121 is shown in Fig. 11 as adjusted for the maximum throw, and in Fig. 16, this crank pin 121 is adjusted for a smaller throw. This construction, consequently, replaces the disk 66 shown in Fig. 2 for varying the throw of the crank by securing the crank pin in one or other of the threaded holes 83 therein.

130 represents the pitman, which is pivoted adjacent to one end thereof on the crank pin 121 and which has an upwardly projecting end formed to engage the arm 89 which is connected with the bracket 48 to swing the same in the manner described in connection with Figs. 1 to 10. When the crank 121 is adjusted for a shorter throw, the pitman 130 may be readily removed and replaced by another pitman, such for example as the pitman 131 shown in Fig. 16 in which the aperture for the crank pin is located farther from the upper end thereof, since the end of the pitman beyond the crank pin 121 must at all times be long enough to engage the arm 89 of the pivoted bracket 48.

The other end of the pitman 130 is pivotally connected with a gear segment 132 journalled in a bearing pin 133 suitably secured on a stationary part of the frame of the knife sharpening mechanism, so that as the crank wheel 120 revolves about its axis, the pitman imparts an oscillatory motion to the gear segment 132. The teeth of this gear segment mesh with a pinion 135 rotatably mounted on a fixed bearing stud 136 and another gear 137 is rigidly secured to the pinion 135 to rotate therewith and meshes with the rack teeth 75 of the vertically movable bar 76 which carries the belt carriage 34. It will, consequently, be obvious when the arm 89 connected with the bracket 48 is raised to release the second wheel 47 to move into engagement with the flywheel, the crank wheel 120 will be turned through one revolution, causing the pitman 130 to oscillate the gear segment 132 and through the gear 137 to cause the belt carriage to be moved downwardly and then upwardly for sharpening the knife.

The construction shown in Figs. 11, 12 and 16 has the advantages that the upward travel of the sharpening belts is more rapid than the downward travel, which tends to remove burr from the knife, and also that the dwell or time during which there is very little movement of the knife carriage at the lower end of the stroke is reduced, thus reducing the tendency of the sharpening mechanism to round off the lower end or point of the knife.

Means are also provided in the construction shown in Figs. 11 to 16 for automatically releasing the presser foot when the knife sharpening mechanism is placed into operation and this mechanism may, of course, also be applied to the construction shown in Figs. 1 to 10. The locking bolt 19a is slidably arranged on the frame of the machine so that the teeth or projections on the end thereof may move into and out of mesh with the teeth 140 of the rod 19 for holding the rod in any position in which it may be set by the operator, see also Fig. 1, in which this locking bolt is shown for manual operation.

The outer end of the locking bolt 19a is bifurcated as shown at 143 and the manually operated lever 19b is pivotally mounted between a pair of lugs 145 on the machine frame 20 by means of a pivot pin 146 and has one end portion thereof extending into the bifurcated end of the locking bolt 19b and is pivoted thereto by means of a pin 147. The end of this lever is provided with a handle portion 148 arranged in a position convenient to the operator for quickly shifting the locking bolt into and out of engagement with the rack teeth of the rod 19. A spring 150 normally urges the lever 19b into a position in which the locking bolt holds the bar 19 of the presser foot against movement.

In order to automatically shift the locking bolt into unlocking position when the sharpening mechanism begins to operate, means are provided which are actuated by the bracket 48 in such manner that when the bracket swings into position to place the wheel 47 into engagement with the flywheel, the locking bolt is withdrawn from engagement with the rod 19. In the construction illustrated for this purpose, a lever 153 is provided which has a hub portion 154 pivoted concentrically with the axis of the crank wheel 120, for example about the axis of this crank wheel, or on the hub of the gear 64 when this mechanism is employed on the construction shown in Figs. 1 to 10, and this lever has an arm 155, which bears against an edge of the arm 89 of the bracket 48 in the same manner as the pitman 130, except that the arm 155 bears against the arm 89 at all times. The lower end 158 of the lever 153 has a tongue or projection 157 which extends between a bifurcated end 159 on the end of the hand lever 19b.

In the operation of the presser foot releasing mechanism, when the arm 89 is raised to release the pitman 130, the spring 85 which swings the bracket 48 about its pivot, will cause the arm 89 to swing to the right in Figs. 11, 14 and 16, into the position shown in Fig. 13. The spring 85 is stronger than the spring 150 which holds the locking arm in locking engagement, and consequently, this locking arm is swung by the action of the spring 85 into the position shown in Fig. 13, thus releasing the presser foot rod 19 so that the same either falls by gravity to its lower most position, or else is pushed into its lower position by the operator or the belt carriage 34. The automatic mechanism, consequently, prevents the possibility of damage to the presser foot or knife sharpening mechanism due to operation of the sharpening mechanism when the presser foot is locked in an upper position, and relieves the operator of the necessity of lowering the presser foot before the sharpening operation begins.

It will be understood that various changes in the details, materials, and arrangements of parts which has been herein described and illustrated in order to explain the nature of the invention, may be made by those skilled in the art within the principle and scope of the invention, as expressed in the appended claims.

I claim as my invention:

1. In a mechanism for sharpening the edge of a a knife of a cutting machine, comprising knife grinding means, driving means therefor, a carriage for said grinding means arranged to travel lengthwise of the knife edge for presenting the grinding means to different portions of said edge, and a bar slidably mounted on said cutting machine and secured to said carriage, that improvement which comprises a rotary crank, a pitman connected at one end thereof with said crank, means driven by said pitman and engaging said bar for reciprocating the same, and mechanism actuated by said pitman for interrupting movement of said pitman when said crank has completed a revolution.

2. In a mechanism for sharpening the edge of a knife of a cutting machine having a reciprocatory knife actuated by a flywheel, and comprising knife grinding means, a carriage for said grinding means arranged to travel lengthwise of the knife edge for presenting said grinding means to different portions of said edge, and a bar slidably mounted on said cutting machine and secured to said carriage, that improvement which includes a pivoted bracket having a wheel mounted thereon which is movable into and out of engagement with said flywheel when said bracket is swung about its pivot, a rotary crank, gearing connecting said second wheel with said rotary crank, mechanism connecting said crank with said bar for reciprocating the same, and a part associated with said crank arranged to engage a part of said bracket when said crank has completed a revolution to move said bracket into a position in which said second wheel is out of engagement with said flywheel.

3. A knife edge sharpening mechanism according to claim 2, in which said part on said bracket is a pivoted arm yieldingly urged into a position to be engaged by said part associated with said crank and which arm may be swung about its pivot to disengage said part associated with said crank to permit said bracket to swing into a position in which said second wheel engages said flywheel, to start a cycle of operation of said sharpening mechanism.

4. In a mechanism for sharpening the edge of a knife of a cutting machine having a flywheel and comprising knife grinding means, a carriage for said grinding means mounted to travel lengthwise of said knife for presenting said grinding means to different portions of said edge, that improvement which comprises a bracket having a second wheel journalled thereon, a pivot about which said bracket may swing for moving said second wheel into and out of engagement with said flywheel, a pinion rigidly secured to said second wheel, a gear rotatable about said pivot and meshing with said pinion, a drive shaft having a gear mounted thereon meshing with said first mentioned gear for rotating said drive shaft, mechanism actuated by said drive shaft for operating said knife grinding means, means for swinging said bracket about its pivot to move said second wheel into engagement with said flywheel, a pitman pivotally connected at one end thereof eccentrically with said second wheel, mechanism including a rack connected with said carriage and a gear meshing with said rack for reciprocating said carriage and actuated by said pitman, and means associated with said pitman for actuating said bracket to move said second wheel out of engagement with said flywheel.

5. In a mechanism for sharpening the edge of a knife of a cutting machine having a flywheel and comprising knife grinding means, and a carriage for said grinding means mounted to travel lengthwise of said knife for presenting said grinding means to different portions of said edge, that improvement which comprises a bracket having a second wheel journalled thereon, a pivot about which said bracket may swing for moving said second wheel into and out of engagement with said flywheel, a pinion rigidly secured to said second wheel, a gear rotatable about said pivot and meshing with said pinion, a drive shaft having a gear mounted thereon meshing with said first mentioned gear for rotating said drive shaft, yielding means for urging said bracket to swing in a direction in which said second wheel engages said flywheel, a crank rotated by means connected to said drive shaft, a pitman connected at one end with said crank, a rack connected with said carriage, a gear meshing with said rack, a connection between said pitman and said gear for alternately turning said gear in opposite directions to reciprocate said carriage, and means associated with said pitman for moving said bracket against the action of said yielding means to move said second wheel out of engagement with said flywheel.

6. In a mechanism for sharpening the edge of a knife of cutting machines, comprising knife grinding means, driving means therefor including a flywheel from which power is derived for operating said grinding means, and a carriage for said grinding means arranged to travel lengthwise of said knife edge for presenting said grinding means to different portions of said edge, that improvement which comprises a rotary crank, a pitman connected at one end with said crank, connecting means between said pitman and carriage for moving said carriage lengthwise of said knife edge, a pivoted bracket having a second wheel journalled thereon for movement into and out of driving engagement with said flywheel, means connecting said crank and said second wheel for rotating said crank, means for yieldingly urging said bracket into a position in which said second wheel contacts said flywheel to receive power therefrom, and means actuated by said pitman during the movement of the same with said crank for moving said bracket into a position in which said second wheel is out of engagement with said flywheel for interrupting the movement of said carriage.

7. In a mechanism for sharpening the edge of a knife of a cutting machine having a flywheel and comprising knife grinding means, and a carriage for said grinding means mounted to travel lengthwise of said knife for presenting said grinding means to different portions of said edge, that improvement which comprises a bracket having a second wheel journalled thereon, a pivot about which said bracket may swing for moving said second wheel into and out of engagement with said flywheel, a drive shaft, gearing connecting said second wheel and said drive shaft for rotating the same when said second wheel is in engagement with said flywheel, a crank rotated by said drive shaft, means actuated by said crank for imparting reciprocatory motion to said carriage, a part movably mounted on said bracket, and a part on said crank formed to engage said part on said bracket when said crank has moved through a revolution, to move said bracket into a position in which said second wheel is out of engagement with said flywheel.

8. In a mechanism for sharpening the edge of a knife of a cutting machine having a flywheel and comprising knife grinding means, and a carriage for said grinding means mounted to travel lengthwise of said knife for presenting said grinding means to different portions of said edge, that improvement which comprises a bracket having a second wheel journalled thereon, a pivot about which said bracket may swing for moving said second wheel into and out of engagement with said flywheel, a drive shaft, gearing connecting said second wheel and said drive shaft for rotating the same when said second wheel is in engagement with said flywheel, a crank rotated by said drive shaft, a pitman connected at one end thereof with said crank and operatively connected with said carriage for reciprocating the same, yielding means for urging said bracket into a position in which said second wheel engages said flywheel, and a part on said bracket extending into the path of movement of said pitman when the same has been moved by a revolution of said crank, for shifting said bracket against said yielding means into a position in which said second wheel is out of engagement with said flywheel.

9. In a mechanism for sharpening the edge of a knife of a cutting machine having a flywheel and comprising knife grinding means, and a carriage for said grinding means mounted to travel lengthwise of said knife for presenting said grinding means to different portions of the edge of said knife, that improvement which comprises a bracket having a second wheel journalled thereon, a pivot about which said bracket may swing for moving said second wheel into and out of engagement with said flywheel, a drive shaft, gearing connecting said second wheel and said drive shaft for rotating the same when said second wheel is in engagement with said flywheel, a crank rotated by said drive shaft, means actuated by said crank for imparting reciprocatory motion to said carriage, an arm on said bracket, a part connected with said crank formed to engage said arm when said crank has been moved through a revolution to move said bracket into a position in which said second wheel is out of engagement with said flywheel, said arm being movable manually relatively to said bracket to disengage said part connected with said crank to permit said bracket to swing into a position in which said second wheel is in engagement with said flywheel.

10. A sharpening mechanism for cutting machines according to claim 9, in which said arm is pivoted on said bracket and is yieldingly held in operative relation to said part connected with said crank and may be swung manually about its pivotal connection with said bracket out of engagement with said part to start the cycle of operation of said sharpening mechanism.

11. A sharpening mechanism for cutting machines according to claim 9, characterized in that said part connected with said crank is a pitman which is connected at one end thereof to said crank, and in which said arm is engaged by said pitman to move said bracket into an inoperative position.

12. In a mechanism for sharpening the edge of a knife of cutting machines comprising knife grinding means, driving means therefor, a carriage for said grinding means arranged to travel lengthwise of the knife edge for presenting the grinding means to different portions of said edge, and a bar slidably mounted on said cutting machine and secured to said carriage, that improvement which comprises rack teeth on said bar, a gear meshing with said rack teeth, a pinion of materially smaller diameter than said gear and secured to said gear, a gear segment meshing with said pinion, a rotary crank driven by said machine, and a pitman pivotally connected at one end with said crank and at the other end with said segment.

13. In a mechanism for sharpening the edge of a knife of cutting machines comprising knife grinding means, driving means therefor, a carriage for said grinding means arranged to travel lengthwise of the knife edge for presenting the grinding means to different portions of said edge, and a bar slidably mounted on said cutting machine and secured to said carriage, that improvement which comprises a rotary crank driven by said machine, a pitman connected at one end with said crank, rack teeth on said pitman, rack teeth on said bar, a pinion mounted to rotate about a fixed axis and meshing with the rack teeth of said pitman, a gear of materially larger diameter than said pinion and secured in fixed relation to said pinion and meshing with the rack teeth of said bar, said pinion and gear being alternately turned in opposite directions when said pitman is actuated by said crank, to reciprocate said bar for imparting reciprocatory motion to said carriage.

14. In a mechanism for sharpening the edge of a knife of a cutting machine having a reciprocatory knife and including a presser foot movable in advance of the knife, knife grinding means including upper and lower abrasive belts arranged one above the other, a carriage for said grinding means arranged to travel lengthwise of the knife edge for presenting said grinding means to different portions of said edge and a shoe for each belt yieldingly urged into position to move portions of said belts into engagement with the knife, that improvement which includes a cam arranged in operative relation to the shoe of the lower belt, a rod pivotally mounted on said carriage and connected with said cam and having a part extending into engagement with said presser foot when said carriage approaches the lower portion of its movement, to move said cam into a position to move the shoe of the lower belt out of engagement with said lower belt to release the same from engagement with said knife during the lower portion of the movement of said carriage, and resilient means for returning said rod and said cam into positions to release said lower shoe when said carriage moves upwardly from its lower position.

15. In a mechanism for sharpening the edge of a knife of a cutting machine having a flywheel, knife grinding means movable vertically lengthwise of the knife for presenting said grinding means to different portions of the edge of the knife, a presser foot secured on a rod movable vertically on the machine, and a locking bolt adapted to engage said rod for holding the same against movement, that improvement which comprises a bracket having a friction wheel mounted thereon and movable to place said friction wheel into and out of driving connection with said flywheel, and means connecting said bracket and said locking bolt to move said locking bolt out of engagement with said rod, when said bracket is moved into position to place said friction wheel into engagement with said flywheel.

16. In a mechanism for sharpening the edge of a knife of a cutting machine having a flywheel, knife grinding means movable vertically lengthwise of the knife for presenting said grinding means to different portions of the edge of the knife, a presser foot secured on a rod movable vertically on the machine, and a locking bolt adapted to engage said rod for holding the same against movement, that improvement which comprises a bracket having a friction wheel mounted thereon and pivotally mounted to move said friction wheel into and out of driving engagement with said flywheel, and a pivoted lever having a part which engages said locking bolt and another part engaging said bracket and which lever is swung by said bracket to move said locking bolt out of engagement with said rod when said bracket moves into position to place said friction wheel into engagement with said flywheel.

17. In a mechanism for sharpening the edge of a knife of a cutting machine having a flywheel, knife grinding means movable vertically lengthwise of the knife for presenting said grinding means to different portions of the edge of the knife, a presser foot secured on a rod movable vertically on the machine, and a locking bolt adapted to engage said rod for holding the same against movement, that improvement which comprises a pivoted bracket having a friction wheel mounted thereon, said bracket being movable into and out of an operative position in which said friction wheel is in engagement with said flywheel, a pivoted lever having one arm thereof engaging said locking bolt and having the other arm engaging a part of said bracket, a spring urging said bracket into position to move said friction wheel into engagement with said flywheel, a second spring weaker than said first spring urging said locking bolt into locking position and said lever into engagement with said part of said bracket, and means actuated upon completion of the cycle of movement of said knife grinding means for moving said bracket into inoperative position, said bracket when moved by said first mentioned spring into operative position swinging said lever into position to move said locking bolt out of locking engagement with said rod.

18. In a knife sharpening mechanism for cutting, sharpening the edge of a knife of a machine comprising knife grinding means, driving means therefor, a carriage for said grinding means arranged to travel lengthwise of the knife edge for presenting the grinding means to different portions of said edge, and a bar slidably mounted on said cutting machine and secured to said carriage and provided with rack teeth, that improvement which comprises a rotary crank driven by said machine, a pitman connected at one end with said crank, a gear meshing with said rack teeth, and a pinion secured coaxially to said gear and of materially smaller diameter than said gear, and an operative connection between said pitman and said pinion for alternately rotating said pinion in opposite directions for reciprocating said bar and said carriage.

FREDERICK G. CLARK.

REFERENCES CITED

The following references are of record in the file of this patent:

UNITED STATES PATENTS

| Number | Name | Date |
|---|---|---|
| 183,061 | Locke | Oct. 10, 1876 |
| 1,004,285 | Maimin | Sept. 26, 1911 |
| 1,471,667 | Litot | Oct. 23, 1923 |
| 1,564,574 | Hunt | Dec. 8, 1925 |
| 1,779,981 | Nickerson | Oct. 28, 1930 |
| 2,060,197 | Greenbaum | Nov. 10, 1936 |
| 2,156,798 | Bangser | May 2, 1939 |
| 2,183,786 | Clark | Dec. 19, 1939 |
| 2,183,787 | Clark | Dec. 19, 1939 |
| 2,183,788 | Clark et al. | Dec. 19, 1939 |
| 2,244,813 | Tommerup | June 10, 1941 |
| 2,281,023 | Clark et al. | Apr. 28, 1942 |
| 2,295,654 | Gury | Sept. 15, 1942 |
| 2,300,534 | Clark et al. | Nov. 3, 1942 |
| 2,300,535 | Clark | Nov. 3, 1942 |
| 2,411,851 | Caserta | Dec. 3, 1946 |
| 2,529,441 | Zawistowski | Nov. 7, 1950 |